(12) United States Patent
Chand et al.

(10) Patent No.: US 7,801,628 B2
(45) Date of Patent: Sep. 21, 2010

(54) INDUSTRIAL OPERATOR INTERFACES INTERACTING WITH HIGHER-LEVEL BUSINESS WORKFLOW

(75) Inventors: Sujeet Chand, Brookfield, WI (US); Stephen C. Briant, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 726 days.

(21) Appl. No.: 11/239,935

(22) Filed: Sep. 30, 2005

(65) Prior Publication Data

US 2007/0078667 A1   Apr. 5, 2007

(51) Int. Cl.
*G05B 11/01*   (2006.01)
(52) U.S. Cl. ............................. 700/17; 700/12; 705/1.1
(58) Field of Classification Search .................. 700/12, 700/17; 705/1, 1.1
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,301,320 A | 4/1994 | McAtee et al. |
| 5,446,868 A | 8/1995 | Gardeá et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |
| 5,675,748 A | 10/1997 | Ross |

(Continued)

OTHER PUBLICATIONS

Pitzek et al., Configuration and Management of a Real-Time Smart Transducer Network, 2003 IEEE, 2003, 4 pages.

(Continued)

*Primary Examiner*—Albert DeCady
*Assistant Examiner*—Steven R Garland
(74) *Attorney, Agent, or Firm*—Turocy & Watson LLP; William R. Walbrun; John M. Miller

(57) ABSTRACT

Systems and methods are provided that enable high-level and abstract business engines to affect and influence plant-floor or industrial operations via dynamic and flexible operator interfaces. In a similar manner, actions directed from the operator interfaces can be communicated to higher level decision components of an enterprise to facilitate automated control and dynamics of the enterprise. In one aspect, an industrial automation system is provided. The system includes one or more controllers to process transaction events in an industrial automation environment. One or more operator interface components are provided that automatically adapt interface control functionality based on the transaction events.

32 Claims, 9 Drawing Sheets

U.S. PATENT DOCUMENTS

| | | |
|---|---|---|
| 5,715,413 A | 2/1998 | Ishai et al. |
| 5,721,905 A | 2/1998 | Elixmann et al. |
| 5,761,499 A | 6/1998 | Sonderegger |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru et al. |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,334,158 B1 * | 12/2001 | Jennyc et al. ............... 719/328 |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung, et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,356,482 B2 * | 4/2008 | Frankland et al. ............... 705/8 |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0194577 A1 | 12/2002 | Connor et al. |
| 2003/0014387 A1 | 1/2003 | Kreidler et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0093588 A1 * | 5/2004 | Gschwind et al. ........... 717/130 |
| 2004/0098153 A1 | 5/2004 | Neudeck |
| 2004/0167790 A1 | 8/2004 | Grasse |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2005/0005289 A1 | 1/2005 | Adolph et al. |
| 2005/0044112 A1 | 2/2005 | Yamamoto et al. |
| 2005/0065829 A1 | 3/2005 | Birkhoelzer |

| | | |
|---|---|---|
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0182768 A1* | 8/2005 | Waldorf et al. ............... 707/10 |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0059029 A1* | 3/2006 | Chalasani et al. ............... 705/8 |
| 2007/0016429 A1* | 1/2007 | Bournas et al. ................ 705/1 |

OTHER PUBLICATIONS

European Search Report dated Jun. 12, 2005 for European Patent Application Serial No. EP05016793, 3 pages.

John Kubiatowicz, et al. "OceanStore: An Architecture for Global-Scale Persistent Storage" ASPLOS 2000, Cambridge, Massachusetts (2000).

Roy Goldman, et al. "From Semistructured Data to XML: Migrating the Lore Data Model and Query Language" (1999).

* cited by examiner

INDUSTRIAL OPERATOR INTERFACES INTERACTING WITH HIGHER-LEVEL BUSINESS WORKFLOW

TECHNICAL FIELD

The subject invention relates generally to industrial control systems, and more particularly to interfacing and controlling lower-level manufacturing operations from a higher-level transaction language or process.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

One aspect that has not changed too much over the years is the need to program each phase of a PLC operation. Thus, if a change is required in a process, or the dynamics of an operation change over time, the PLC may need to be reprogrammed to account for such changes. As can be appreciated, having to re-program or change an existing automated operation can be time-consuming and expensive. Also, these changes can influence actual operator procedures resulting from such changes. For instance, one area that is generally in flux is the interaction between operators interacting with the PLC and possibly higher-level work flows that may be occurring in other areas of the plant. For example, an operator may be running an interface that controls some aspect of an industrial manufacturing operation. A business application may have detected in some other system that some element of the PLC process should be changed or varied in order to properly manufacture the respective product. This could include altering how the PLC and respective operator interfaces function in order to manage potential changes. Although, controllers can be programmed to perform substantially any type of manufacturing operation, current PLC architectures are somewhat inflexible in this regard. Unless the PLC had been previously programmed to account for the change, the current process may have to be stopped in order to respond in a desired manner.

In addition to system or process dynamics, many PLC systems can operate over a plurality of different type of networks and often to higher level processing systems such as batch servers, process servers, and other business applications. Networks can include lower level networks that are local in nature for controlling local cell operations to higher level networks such as Ethernet that can communicate to substantially any remote location within a plant or across the Internet, for example. Although, there may be pre-programmed interactions between these higher-level processes and lower-level PLCs and interfaces across the networks, standard ladder-logic programs are not generally suitable to account for changing factory dynamics that may have to alter operations in ways that cannot be predicted when designing the lower-level control programs. Generally, PLC programs have not been standardized in any generic manner to account for interactions that may influence lower-level operations. For instance, this could include a detected parameter change in a raw materials inventory that would require process changes in order to properly utilize the inventory. In current architectures, lower-level PLC operations, interfaces, and procedures would have to be re-programmed in order to account for such changes.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Dynamic operator interfaces are provided that can be automatically generated and controlled in a bidirectional manner from high-level work-flow or business processes that are integrated with lower-level control operations. In one aspect, an industrial control system can include control elements and/or higher level servers that cooperate to execute a higher level or abstract transaction language. Such language can include a business execution language that operates at the front end of an enterprise to control resources and output from the enterprise without being involved in the lower level control decisions of the enterprise. In one example, if a change were detected at an upper level, this change or condition could be communicated downward via the transaction language to an operator interface that may specify some action for an operator such as acknowledging a change in a process or procedure. Similarly, if conditions change at a lower level, operators can communicate via the interfaces to higher order process or components in the enterprise to automatically adapt to dynamic manufacturing conditions while mitigating the need to reprogram lower level control elements and/or retrain existing personnel.

In one example aspect, business process behavior can be based on a transaction language such as a Business Process Execution Language where business processes can be described in at least two ways. Executable business processes can model actual behavior of a participant in a business interaction, whereas business protocols, in contrast, can employ process descriptions that specify mutually visible message exchange behavior of each of the parties involved in the protocol, without revealing their internal behavior. Thus, process descriptions for business protocols can be referred to as abstract processes. From these abstract processes, control decisions can be passed to or from operator interfaces that interact with operators at the production end of an enterprise.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Systems and methods are provided that enable high-level and abstract business engines to affect and influence plant-floor or industrial operations via dynamic and flexible operator interfaces. In a similar manner, actions directed from the operator interfaces can be communicated to higher level decision components of an enterprise to facilitate automated control of the enterprise. In one aspect, an industrial automation system is provided. The system includes one or more controllers to process transaction events in an industrial automation environment. Such events can be executed from a business transaction language, for example. One or more operator interface components are provided that automatically adapt interface control functionality based on the transaction events.

It is noted that as used in this application, terms such as "component," "transaction," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
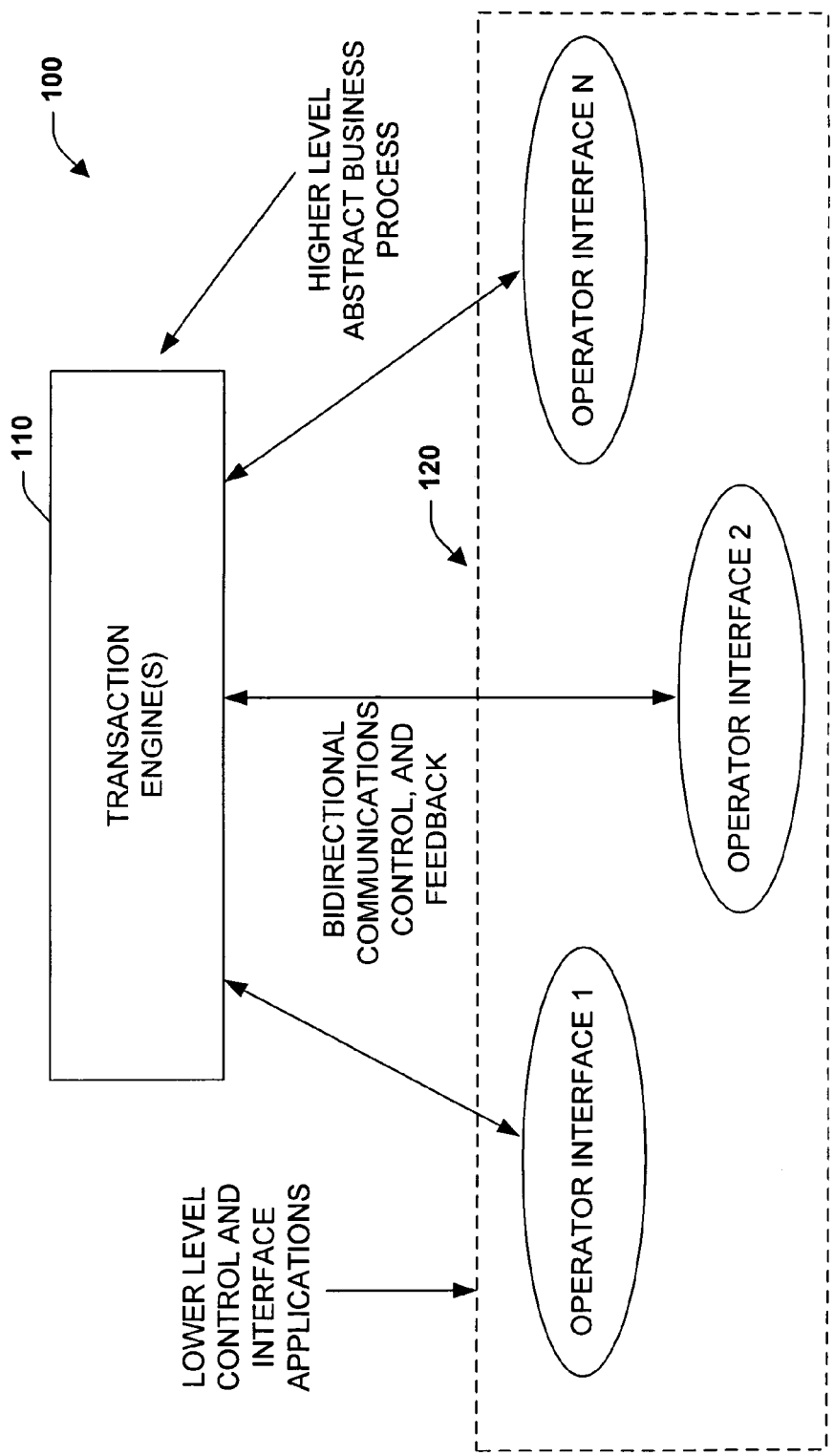
FIG. 1 is a schematic block diagram illustrating a transaction engine and operator interface system.

Referring initially to FIG. 1, a system 100 illustrates one or more transaction engines 110 that control and interact with one or more operator interfaces 120. The transaction engines 110 generally run higher level processes such as a business process or other application and generally operate in a more abstract manner than an industrial controller such as a Programmable Logic Controller (PLC) which typically operates ladder logic. Although the transaction engine 110 can operate as part of a PLC controller or engine, it can also be associated with other networked systems such as a business, batch or process servers which are described in more detail with respect to FIG. 2.

In one example application, the transaction engine 110 can operate a Business Process Execution Language (BPEL). The operator interfaces 120 communicate with transaction languages operating on the engines 110 and can be altered or controlled based on dynamics or condition changes detected in a business or manufacturing environment, for example. For instance, the transaction engine 110 generally would operate on a more abstract level of order entry, inventory, raw material planning, asset management and so forth. If a manufacturing condition change were detected at this level, controls could be sent to the operator interfaces 120 to affect how operators interact with the new changes. In one specific example, assume a different type of material was purchased that was to be employed in final production of a product. This detected change could cause interface changes at the operator interface 120 including getting confirmation from an operator, sending new manufacturing instructions, eliciting feedback from the operators, and so forth. In essence, a bidirectional level of communications and control can be established between the transaction engines 110 and the operator interfaces 120.

In a pharmaceutical application, for example, a pharmacist operating on the plant floor may detect some system or material change affecting quality of manufactured goods. Controls or data can be set from the interfaces 120 to the transaction engine 110 that allows recognition of such changes to be applied to higher levels of the business or enterprise. For example, it may be determined that the pH-level in a storage or holding bin needs to be adjusted, and this information can be communicated to the transaction engine 110 from the operator interface 120. After communicating such information, the transaction engine 110 can send automated signals to other components in the plant to alter or adjust the pH level in the storage bin. In this manner, control can be communicated in a bidirectional manner without having to reprogram the system 100 to account for different conditions, products, materials, variables, parameters, or other dynamics/changes. In other words, context from other levels of a business process can be communicated down to lower levels to facilitate decision-making processes in the plant. Likewise, information can be communicated upwards from the operator interfaces 120, which may impact other areas of the business or enterprise.

In general, the transaction engine 110 operates at an abstract level such as deciding what quantity of a product to produce, whereas lower level controllers are programmed with the ability to actually produce the product such as with a batch processor. The operator interfaces 120 can be dynamically adjusted or responded to in a manner that reflects detected higher level dynamics or communicates information from the lower levels of a process from an operator while mitigating the need to reprogram lower-level control elements. Thus, business protocols in the transaction engine 110 should be described and provided in a platform-independent manner and should capture behavioral aspects that have cross-enterprise business significance. Respective system participants or components can then determine and plan for conformance to the business protocol without generally engaging in the process of manual human agreement that adds to the difficulty of establishing cross-enterprise automated business processes.

In general, business protocols at the transaction level can include data-dependent behavior. For example, a supply-chain protocol can depend on data such as the number of line items in an order, the total value of an order, or a deliver-by deadline. Defining business intent in these cases can include the employment of conditional and time-out constructs which are described in more detail below. This can also include the ability to specify exceptional conditions and their consequences, including recovery sequences, which can be as important for business protocols as the ability to define the behavior when operations are running normally. Long-running interactions can include multiple, often nested units of work, each with its own data requirements. In another aspect, the transaction engine 110 can employ message properties to identify protocol-relevant data embedded in messages that communicate with the operator interfaces 120 as will be describe in more detail below.

It is noted that the operator interface 120 can be extended to include one type of resource interface, where the other types would include equipment interfaces where physical equipment is being interfaced with. The interface to a human (operator interface) could also be considered as equipment. An example of equipment could be an automated barcode scanner, an RFID reader or a pH meter and so forth. This could also consider the PLC to be capable of representing workflow, equipment flow, and material flow as native representations, for example. These flows can be referred to as sequences where equipment sequencing is typically represented with Sequential Function Charts (SFCs).

Another form of sequence is that of a state machine, such as process control, that can be considered as a 'state oriented control' where the process is managed by manipulating the status of equipment, which infers a state machine for the equipment exists, for what states the equipment can exist in, and what commands are supported. Thus, an integration of the state of the process control system can be achieved with higher level work flow and the operator inputs, which may also be represented as a work flow, for example.

Figure 2:
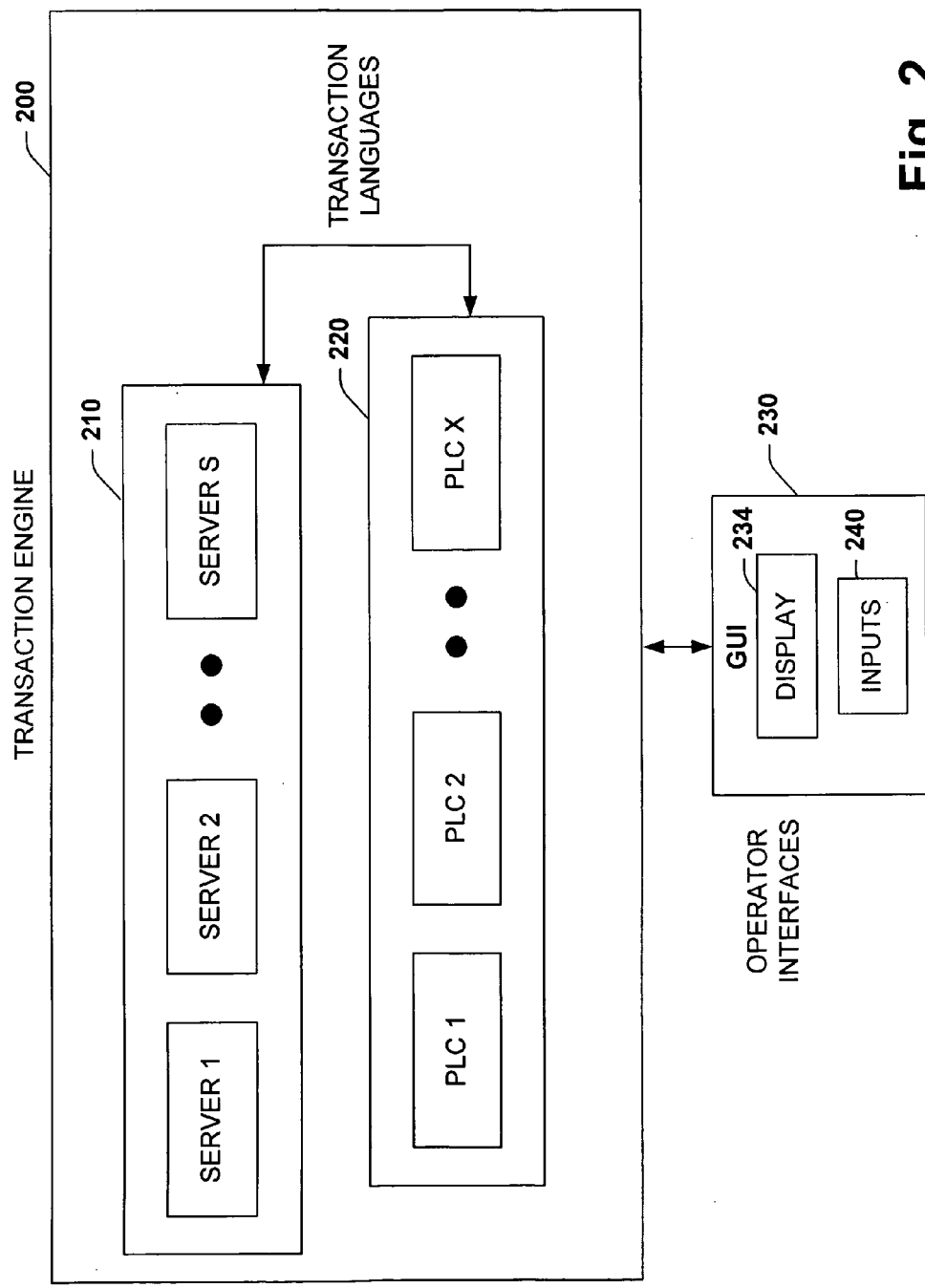
FIG. 2 is a schematic block diagram illustrating transaction engine aspects and industrial control elements for operator interface interaction.

Turning to FIG. 2, a transaction engine 200 is illustrated that can include one or more servers 210 and/or Programmable Logic Controllers (PLCs) 220. In general a transaction language (e.g., BPEL) executes on the servers 210 and/or PLCs to control operations of an enterprise. This can include running the transaction languages primarily on the servers 210, primarily on the PLCs, 220 or shared in some manner between the PLCs and the servers. For example, if a business transactional language were running on the servers 210, the PLCs 220 could be adapted with message and event handling capabilities to interact with the respective language. If plant floor changes were detected via an operator interface 230, these changes can be communicated via to the PLC and/or server to potentially affect changes at higher levels of the enterprise. Likewise, enterprise decisions affecting lower level operations can be communicated to the operator interface 230. For example, a new procedure could be outputted to the interface 230 requiring the operator to acknowledge the procedure via feedback. Simpler actions could direct the operator to adjust a parameter or an instruction in a control or to merely have the operator acknowledge some detected condition from the transaction engine 200.

As illustrated, the operator interface 230 can include a Graphical User Interface (GUI) to interact with the transaction engine 200. This can include substantially any type of application that sends, retrieves, processes, and/or manipulates factory input data, receives, displays, formats, and/or communicates output data, and/or facilitates operation of the enterprise. For example, such interfaces 230 can also be associated with an engine, editor tool or web browser although other type applications can be utilized. The GUI 230 includes a display 234 having one or more display objects (not shown) including such aspects as configurable icons, buttons, sliders, input boxes, selection options, menus, tabs and so forth having multiple configurable dimensions, shapes, colors, text, data and sounds to facilitate operations with the engine 200. In addition, the GUI 230 can also include a plurality of other inputs 240 or controls for adjusting and configuring one or more aspects. This can include receiving user commands from a mouse, keyboard, speech input, web site, remote web service and/or other device such as a camera or video input to affect or modify operations of the GUI 230.

It is also noted that the term PLC as used herein can include functionality that can be shared across multiple components, systems, and or networks. One or more PLCs 220 can communicate and cooperate with various network devices across a network. This can include substantially any type of control, communications module, computer, I/O device, Human Machine Interface (HMI)) that communicate via the network which includes control, automation, and/or public networks. The PLC 220 can also communicate to and control various other devices such as Input/Output modules including Analog, Digital, Programmed/Intelligent I/O modules, other programmable controllers, communications modules, and the like.

The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Before proceeding, it is noted that FIGS. 3-8 are directed to operator interface operations and details with an example business process execution language. It is to be appreciated however than substantially any transaction language that operates on an abstract level (e.g., outside the domain of ladder logic) and interacts with controllers and/or operator interfaces is within the scope contemplated herein.

Figure 3:
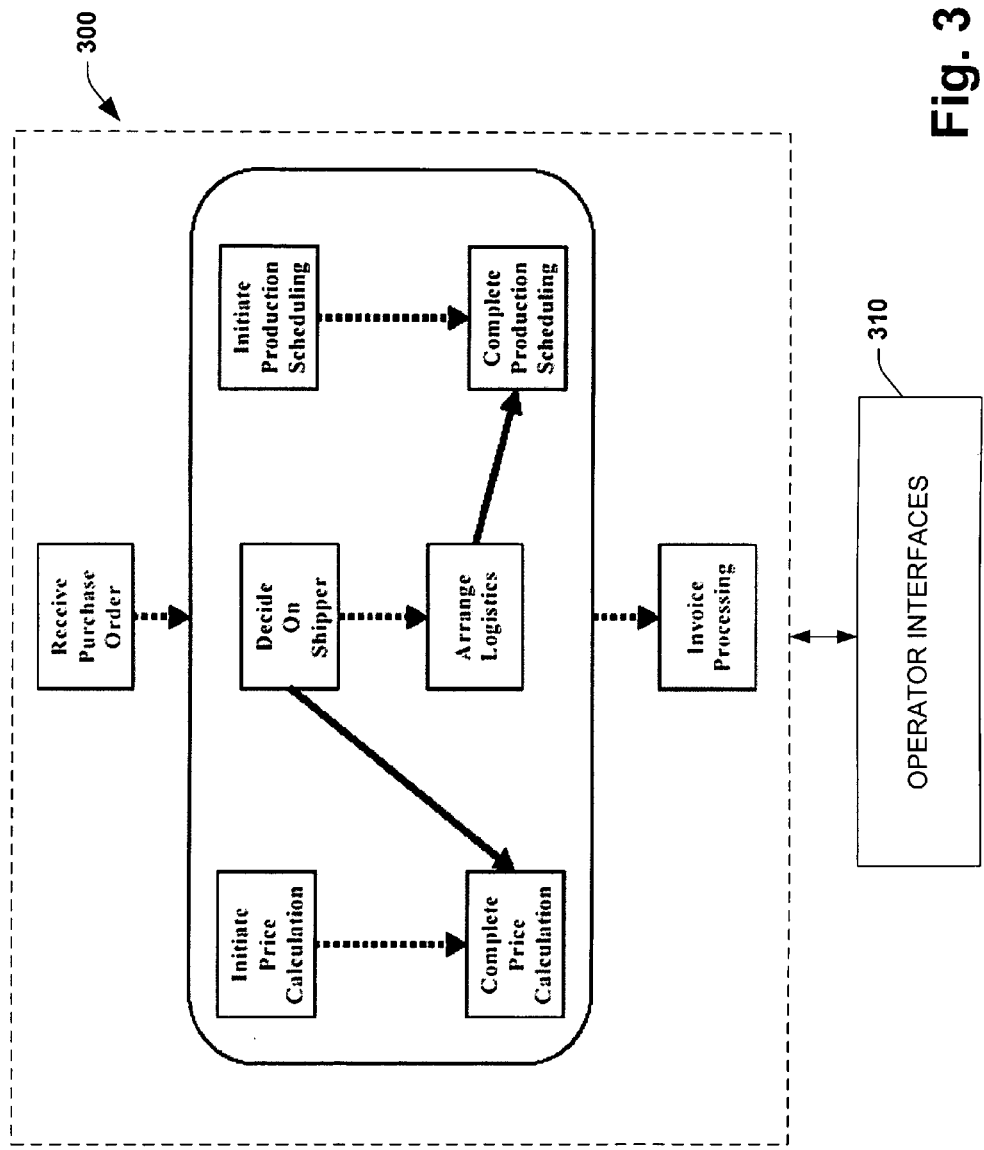
FIG. 3 is a diagram illustrating an example business process and operator interface.

Referring now to FIG. 3, an example business process 300 and operator interface 310 is illustrated. As illustrated, the process 300 can include business components or elements such as receiving a purchase order, initiating a price calculation, completing the price calculation, determining shipping arrangements, determining logistics, production scheduling and so forth. Such processes can be executed on a control system as described above in FIG. 2 and interact with one or more operator interfaces 310. Dotted lines in the process 300 represent sequencing, whereas free grouping of sequences represents concurrent sequences. Solid arrows represent control links used for synchronization.

On receiving the purchase order from a customer, the example process 300 initiates three tasks concurrently: calculating the final price for the order, selecting a shipper, and scheduling production and shipment for the order. While some of the processing can proceed concurrently, there are control and data dependencies between the tasks. In particular, the shipping price is required to finalize the price calculation, and the shipping date is required for the complete fulfillment schedule. When these tasks are completed, invoice processing can proceed and an invoice is sent to the customer. If some change or other dynamic were detected in the process 300, controls and interface options could be directed to the operator interface 300 (e.g., send operator interface panel window asking for explicit operator feedback). Generally, a business process can be defined "in the abstract" by referencing port types of services involved in the process, and not their possible deployments. Defining business processes in this manner allows reuse of business process definitions over multiple deployments of compatible services. It is to be appreciated that a plurality of differing type business processes and/or components can be supported other than the example depicted in FIG. 3.

Figure 4:
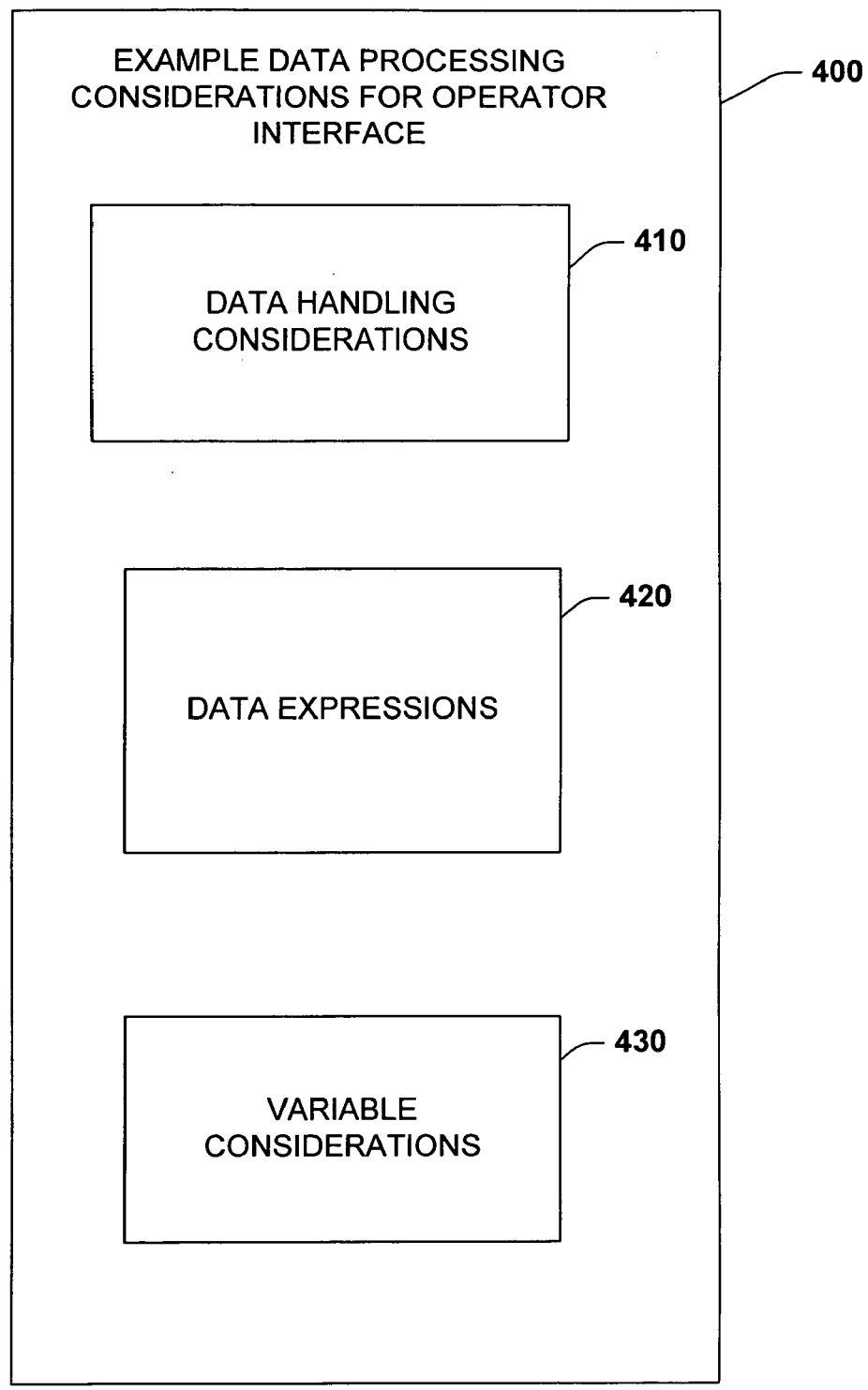
FIG. 4 is a diagram illustrating data processing considerations for operator interface and transaction languages.

FIG. 4 illustrates data processing considerations 400 for operator interface and transaction languages. At 410, data handling considerations are provided. Business processes models can include state-full interactions. Generally, the state involved consists of messages received and sent as well as other relevant data such as time-out values. The maintenance of the state of a business process can employ state variables. Furthermore, the data from the state can be extracted and combined to control the behavior of the process or operator interface, which employs data expressions. At 420, various types of expressions can be provided. These can include: boolean-valued expressions (transition conditions, join conditions, while condition, and switch cases; deadline-valued expressions ("until" attribute of onAlarm and wait); duration-valued expressions ("for" attribute of on Alarm and wait); and/or general expressions (assignment).

Boolean Expressions are expressions where an evaluation results in Boolean values. Deadline-Valued Expressions are expressions that result in values that are of types dateTime or date. Duration-Valued Expressions are expressions that results in values that are of the type duration. General Expressions can be of type (e.g., string, number, or Boolean) and possibly restricted as follows: Numeric values including arbitrary constants are permitted with the equality or relational operators (<, <=, =, !=, >=, >); Values of integral (e.g., short, int, long, unsigned Short, and so forth) type including constants are permitted in numeric expressions, provided that integer arithmetic is performed; Equality operators (=, !=) are permitted when used with values of string type including constants.

At 430 variable considerations include business processes that specify state-full interactions involving the exchange of messages between partners. The state of a business process includes messages that are exchanged as well as intermediate data used in business logic and in composing messages sent to partners of the business, for example. Variables provide one possible means for holding messages that constitute the state of a business process. The messages held are often those that have been received from partners or are to be sent to partners. Variables can also hold data that are needed for holding state related to the process and not exchanged with partners.

Figure 5:
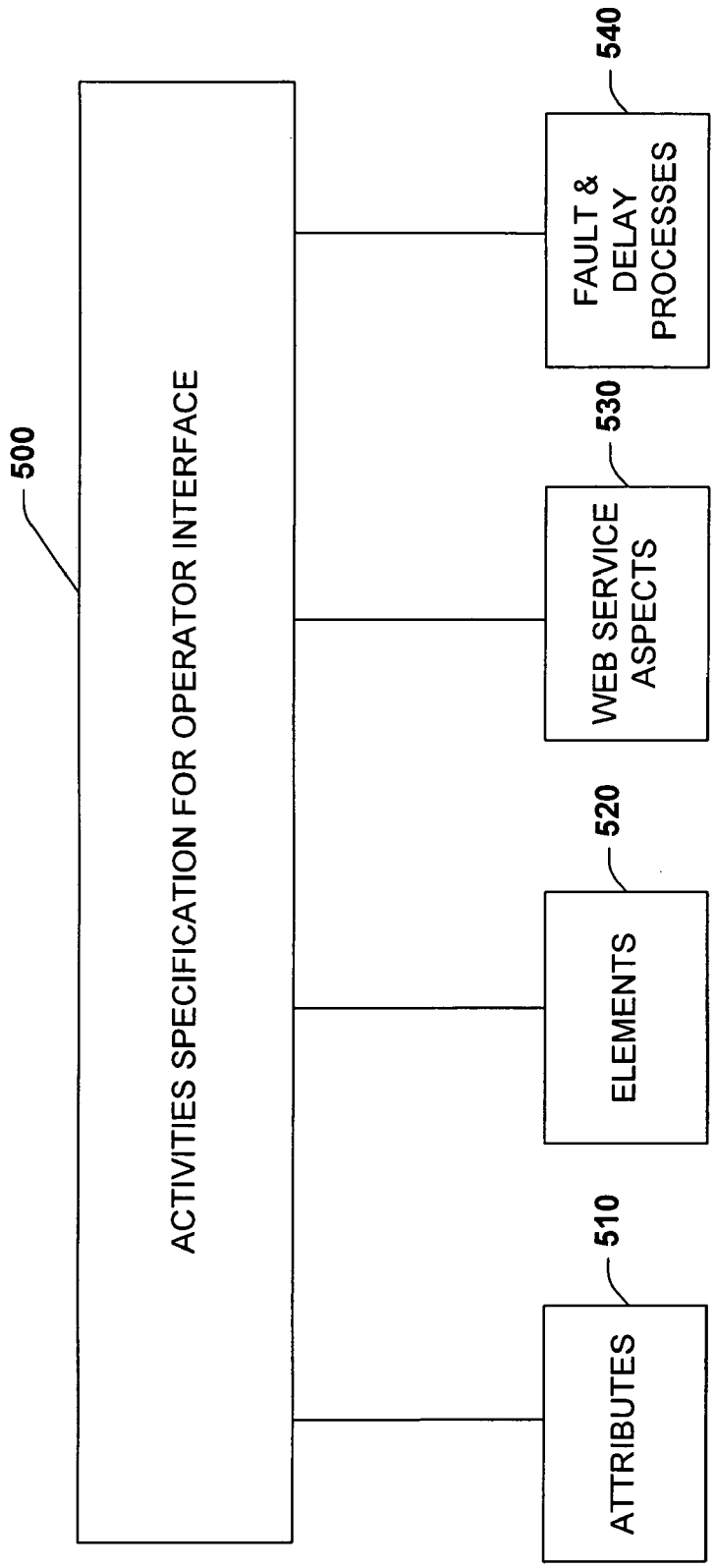
FIG. 5 is a diagram illustrating business process activities for operator interfaces.

FIG. 5 illustrates business process activities 500 that interact with operator interfaces. The activities 500 can include a description of one or more attributes 510 and elements 520. Each activity 500 has optional standard attributes 510 such as a name, a join condition, and an indicator, for example of whether a join fault should be suppressed if it occurs. The activity 510 can have optional nested standard elements <source> and <target> 520. These elements can be employed for establishing synchronization relationships through links. At 530, Web Services can be provided by business partners and can used to perform work in a business process. Invoking an operation on such a service can be a basic activity 500. Such an operation can be a synchronous request/response or an asynchronous one-way operation. An asynchronous invocation uses the input variable of the operation because it does not expect a response as part of the operation. A synchronous invocation may employ an input variable and an output variable. One or more correlation sets can be specified to correlate the business process instance with a slate-full service at the partner's side. In the case of a synchronous invocation, the operation may return a fault message.

Figure 6:
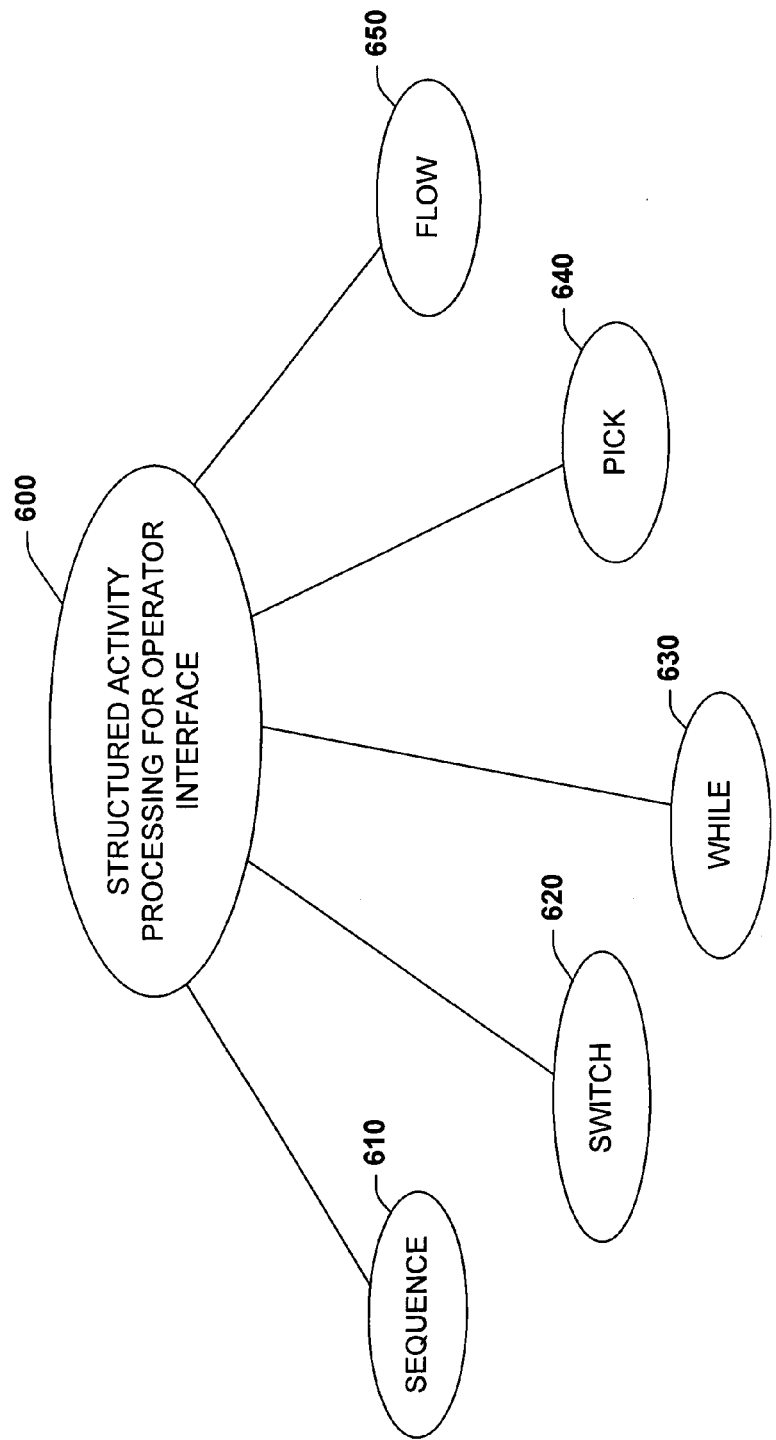
FIG. 6 is a diagram illustrating structured activity processing and operator interface aspects.

Referring now to FIG. 6, structured activity processing is illustrated. Structured activities 600 generally prescribe the order in which a collection of activities take place and, thus, affect operations of an associated operator interface. These structured activities can describe how a business process is created by composing the basic activities it performs into structures that express control patterns, data flow, handling of faults and external events, and coordination of message exchanges between process instances involved in a business protocol, for example. Ordinary sequential control between activities can be provided by sequence 610, switch 620, and while constructs 630. Nondeterministic choice based on external events can be provided by pick constructs 640; and Concurrency and synchronization between events is provided by flow constructs 650.

Referring now to FIG. 6, structured activity processing 600 is illustrated. Structured activities 600 generally prescribe the order in which a collection of activities take place and thus affect operations of an associated operator interface. These can describe how a business process is created by composing the basic activities it performs into structures that express control patterns, data flow, handling of faults and external events, and coordination of message exchanges between process instances involved in a business protocol, for example. Structured activities of include: Ordinary sequential control between activities can be provided by sequence 610, switch 620, and while constructs 630; Nondeterministic choice based on external events can be provided by pick constructs 640; and Concurrency and synchronization between activities is provided by flow constructs 650.

In general, the sequence activity 610 includes one or more activities that are performed sequentially, in the order in which they are listed within a <sequence> element, that is, in lexical order. The sequence activity completes when the final activity in the sequence has completed. The switch structured activity 620 supports conditional behavior in a pattern that occurs often. The activity generally consists of an ordered list of one or more conditional branches defined by case elements, followed optionally by an otherwise branch. The while activity 630 supports repeated performance of a specified, iterative activity. The iterative activity can be performed until a given Boolean while condition no longer holds true. The pick activity 640 awaits the occurrence of one of a set of events and then performs the activity associated with the event that occurred, whereas the flow construct 650 provides concurrency and synchronization for a business or interface operation.

Figure 7:
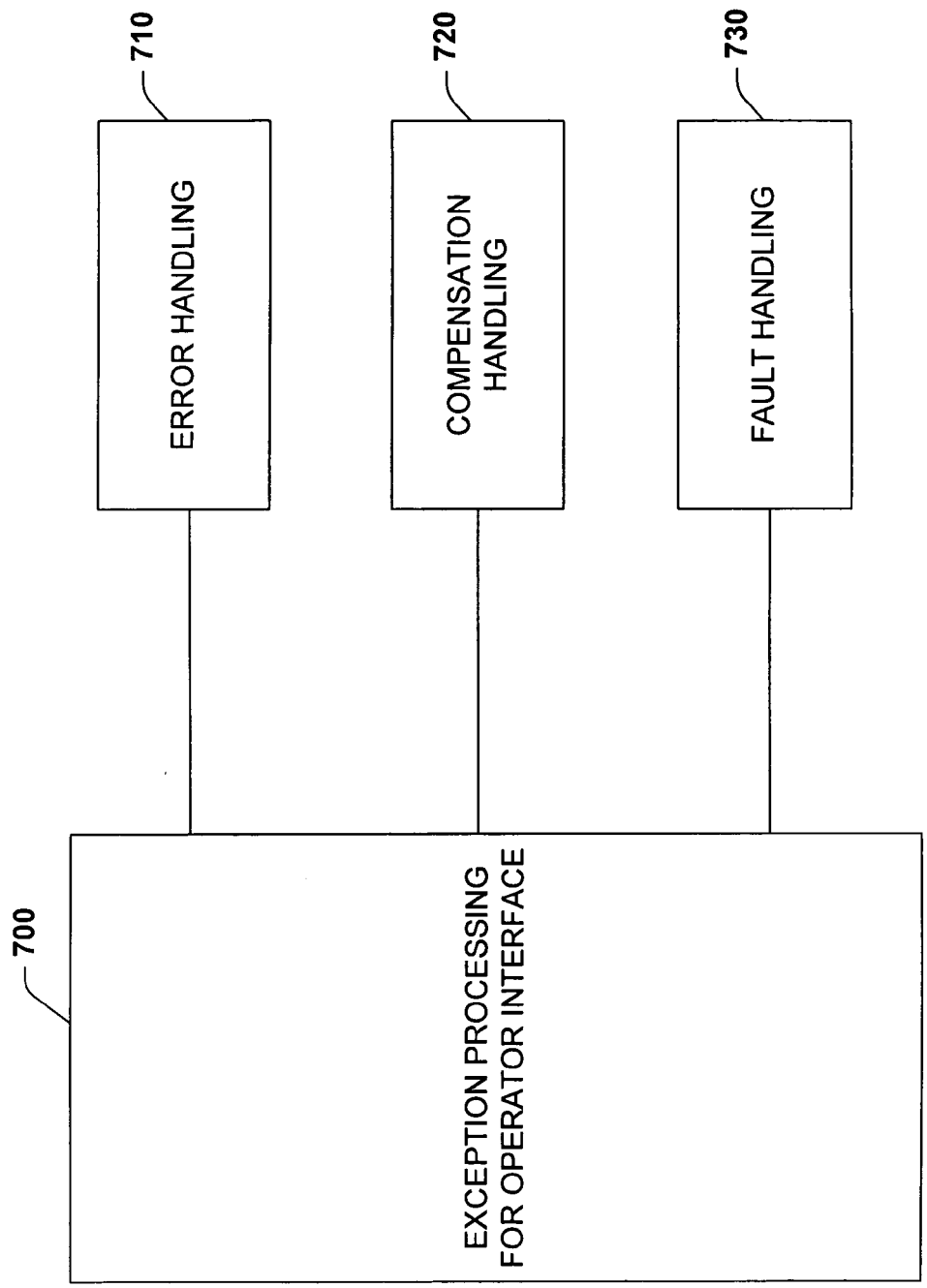
FIG. 7 is a diagram illustrating exception processing for transaction languages and operator interfaces.

FIG. 7 illustrates exception processing 700 for operator interface interactions that can include error handling 710, compensation handling 720, and fault handling 730. Business processes are often of long duration and can use asynchronous messages for communication. They may also manipulate sensitive business data in back-end databases and line-of-business applications. Error handling 710 in business processes often relies heavily on the known concept of compensation, that is, application-specific activities that attempt to reverse the effects of a previous business activity that was carried out as part of a larger unit of work that is now being abandoned. A compensation handler 720 can act as a wrapper for a compensation activity in a business process. In many cases, the compensation handler receives data about the current state of the world and returns data regarding the results of the compensation. A compensation handler, once installed, can be modeled as a self-contained action that is not affected by, and does not affect, the global state of the business process instance.

At 730, fault handling in a business process is a mode switch from normal processing in a scope. Fault handling can be processed as "reverse work" in that its goal is to undo partial and unsuccessful work of a scope in which a fault has occurred. Optional fault handlers attached to a scope component provide a way to define a set of custom fault-handling activities, syntactically defined as catch activities. Each catch activity can be defined to intercept a specific kind of fault, defined by a globally unique fault name and a variable for the data associated with the fault.

Figure 8:
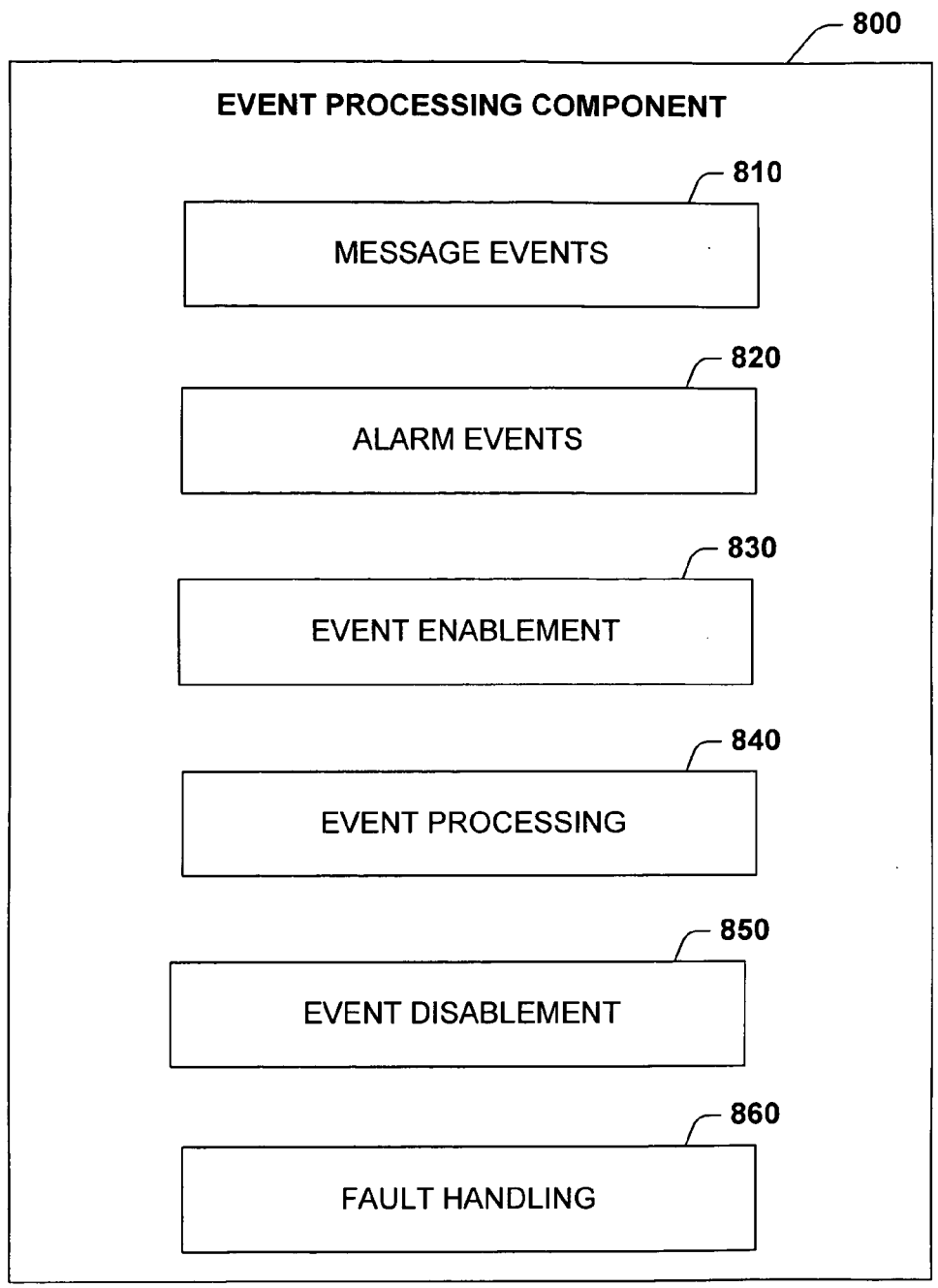
FIG. 8 is a diagram illustrating an event processing component for operator interface interactions.

FIG. 8 illustrates an event processing component 800 that can be employed for operator interface control. Events can be incoming messages that correspond to a request/response or one-way operation. For instance, a status query is likely to be a request/response operation, whereas a cancellation may be a one-way operation. Also, events can be alarms, that go off after user-set times. At 810, a message events tag indicates that the event specified is an event that waits for a message to arrive. The interpretation of this tag and its attributes is similar to a receive data activity. A variable attribute identifies the variable which contains the message received from the partner. The event operation may be either an asynchronous (one-way) or a synchronous (request/response) operation. In the latter case, the event handler or component 800 is expected to use a reply activity to send the response.

At 820, alarm events can be processed. An on-Alarm tag marks a timeout event. A for attribute specifies the duration after which the event will be signaled. A clock for the duration starts at the point in time when the associated scope starts. An alternative until attribute specifies the specific point in time when the alarm will be fired. One of these two attributes may occur in any on-Alarm event. At 830, event handlers associated with a scope are enabled when the associated scope starts. If the event handler is associated with a global process scope, the event handler is enabled when the process instance is created. The process instance is created when the first receive activity that provides for the creation of a process instance (indicated via a create Instance attribute set to yes) has received and processed the corresponding message. This allows the alarm time for a global alarm event to be specified using the data provided within the message that creates a process instance.

At 840, event processing aspects are considered. For alarm events, counting of time for an alarm event with a duration starts when an enclosing event handler is activated. An alarm event goes off when the specified time or duration has been reached. An alarm event is carried out at most once while the corresponding scope is active. The event is disabled for the rest of the activity of the corresponding scope after it has occurred and the specified processing has been carried out. A message event occurs when the appropriate message is received on the specified partner link using the specified port type and operation. At 850, disablement of events generally occurs when all event handlers associated with a scope are disabled when the normal processing of the scope is complete. The already dispatched event handlers are allowed to complete, and the completion of the scope as a whole is delayed until all active event handlers have completed. At 860, event handlers are considered a part of the normal processing of the scope, i.e., active event handlers are concurrent activities within the scope. Faults within event handlers are therefore faults within the associated scope. Moreover, if a fault occurs within a scope, the behavior of the fault handler begins by implicitly terminating all activities directly enclosed within the scope that are currently active. This includes the activities within currently active event handlers.

Figure 9:
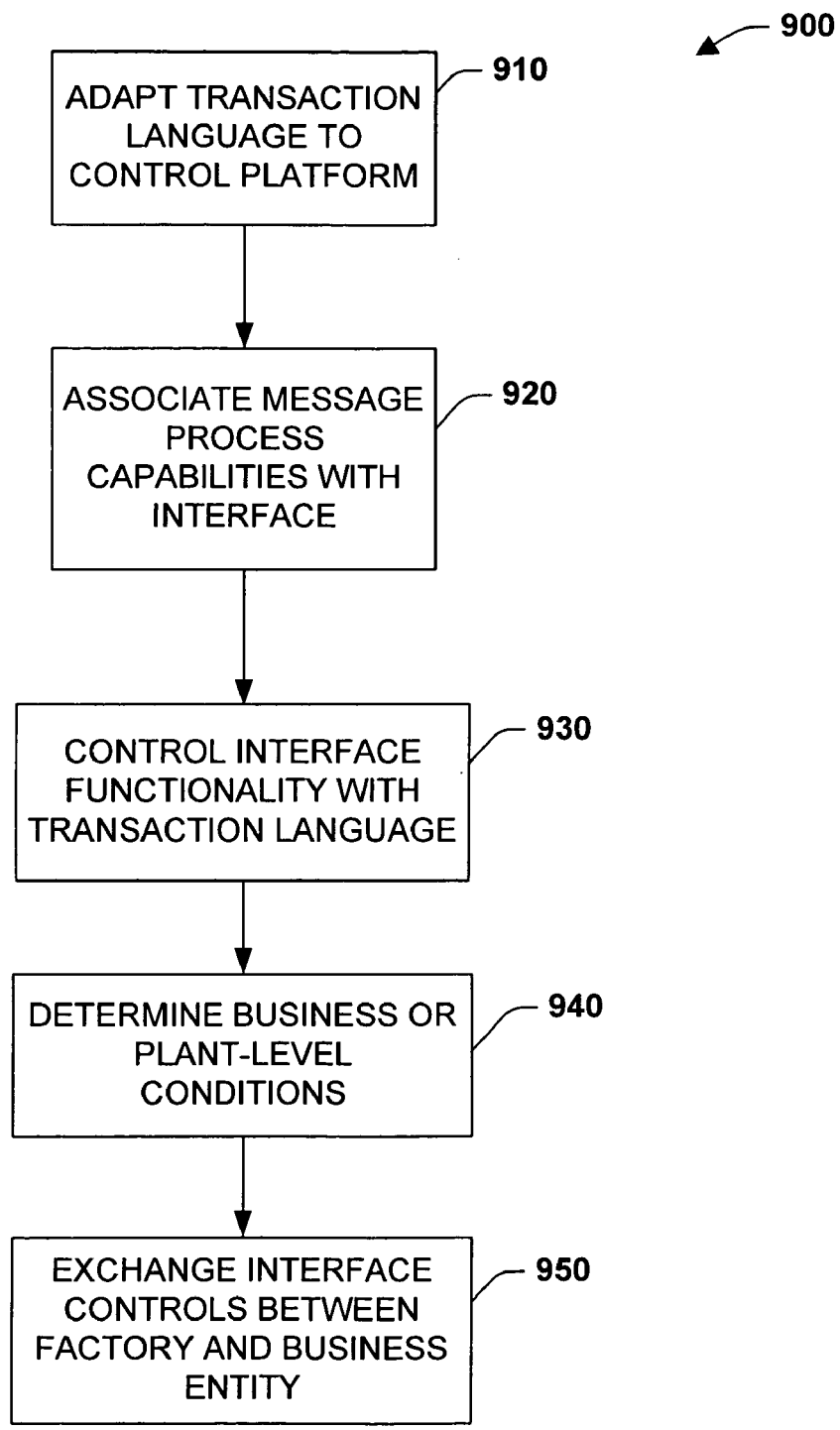
FIG. 9 is a flow diagram illustrating a transaction engine and interface process.

FIG. 9 illustrates a transaction process and interface methodology 900. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

FIG. 9 illustrates a transaction and interface process 900. Proceeding to 910, a transaction language is adapted to a control platform. This can include a business process execution language, for example, and can be adapted to a programmable logic controller, server platform, and/or combination thereof. At 920, one or more operator interfaces are associated with message processing capabilities in order to interact with the transaction language described at 910. This can include synchronous or asynchronous message processing capabilities for altering or changing the functionality of the interface according to dynamic plant-floor or business-detected conditions. At 930, a given interfaced adapted to communicate with the transaction engine or language is controlled from functionality provided by the respective language. For instance, if a change is detected at a high-level area in an enterprise, such change can be communicated to the interface from the transaction language, where interface operations of an operator can be altered to account for the detected change. Similarly, operators can signal via the interface to upper-level transaction controls that circumstances or conditions from the low-levels of the enterprise require changes or alterations to one or more business level components of the enterprise.

At 940, business level (abstract level) or plant-level (control level) conditions are determined. This can include automated monitoring of plant or business variables and automatically initiating operator interface functionality upon detection of variable changes. For instance, if a business or control variable were detected outside a predetermined threshold, automated procedures could be initiated by a transaction engine to invoke procedures with the operator interface to bring the detected variable back within the threshold range. At 950, interface controls are exchanged between the transaction language and the lower level elements of the business via the operator interface. Such controls can include altering routines, procedures, instructions, variables, parameters, authorizations, and so forth that can be automatically administered via the operator interface.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
a processor executing computer executable components stored in memory, the components comprising:
at least one controller that employs a Business Process Execution Language (BPEL) to control operations of an enterprise, wherein the BPEL comprises at least one business process, and the at least one controller includes a transaction engine that determines abstract business level conditions and plant level conditions by automatically monitoring business variables and plant variables and automatically sends a message to an operator interface upon detection of business variable or plant variable changes, wherein the message comprises a state of the at least one business process and one or more controls; and
at least one operator interface that processes the message and responsive to the message dynamically alters interface control functionality based on the message.

2. The system of claim 1, wherein the controller is associated with at least one of a programmable logic controller (PLC), a communications module, or a server.

3. The system of claim 1, wherein the at least one business process comprises a plurality of structured activities, the structured activities include at least one of: a sequence activity, a switch structured activity, a while activity, a pick activity or a flow construct.

4. The system of claim 1, wherein the at least one operator interface employs data expressions to process the message.

5. The system of claim 4, wherein the data expressions include transition conditions, join conditions, while conditions, switch cases, and either deadline-valued expressions or duration-valued expressions.

6. The system of claim 1, wherein the message includes one or more business process activity.

7. The system of claim 6, wherein the one or more business process activity is associated with an attribute, wherein the attribute is at least one of a name, a join condition or an indicator.

8. The system of claim 6, wherein the one or more business process activity employs at least one element.

9. The system of claim 8, wherein the at least one element is associated with at least one of a source or a target.

10. The system of claim 9, wherein the at least one element synchronizes relationships between one or more operator interfaces or one or more transaction engines.

11. The system of claim 8, wherein the at least one activity employs at least two nested elements.

12. The system of claim 6, wherein the at least one activity includes a web service that performs work in the at least one business process.

13. The system of claim 12, wherein the work is a synchronous request/response invocation that employs an input variable and an output variable.

14. The system of claim 13, wherein the output variable includes a fault message.

15. The system of claim 12, wherein the work is an asynchronous one-way invocation.

16. The system of claim 6, wherein the at least one activity includes fault and delay processing.

17. The system of claim 16, wherein the fault and delay processing employs a throw activity that provides a globally unique name for a fault.

18. The system of claim 16, wherein the fault and delay processing employs a wait activity that allows a business process to specify a delay for at least one of: a period of time or until a deadline is reached.

19. The system of claim 1, wherein the controls include at least one of: altering routines, procedures, instructions, variables, parameters or authorizations.

20. The system of claim 1, wherein the at least one operator interface automatically administers the controls.

21. The system of claim 1, wherein the BPEL includes at least one abstract business process defined by referencing port types of services involved in the process.

22. The system of claim 1, wherein the at least one operator interface includes at least one of a resource interface or an equipment interface.

23. The system of claim 22, wherein the equipment interface includes at least one of a barcode scanner, a radio frequency identification (RFID) reader or a pH meter.

24. The system of claim 1, wherein the at least one operator interface is a graphical user interface (GUI).

25. The system of claim 1, wherein the at least one business process specifies state-full interactions involving an exchange of messages between the controller and the operator interface.

26. The system of claim 1, wherein the at least one business process employs conditional constructs, time-out constructs and exceptional conditions.

27. The system of claim 1, wherein the at least one operator interface processes exceptions from the at least one business process by employing at least one of error handling, compensation handling, or fault messages.

28. The system of claim 1, wherein the at least one operator interface comprises an event processing component that processes the message as an event, wherein the event is at least one of a message event, an alarm event, an event enablement, an event processing, an event disablement, or a fault handling.

29. The system of claim 1, wherein the message includes at least one of a synchronous operation or an asynchronous operation.

30. An industrial automation system, comprising:
a processor executing computer executable components stored in memory, the components comprising:
at least one industrial controller that employs a Business Process Execution Language (BPEL) to control operations of an enterprise; and
at least one interface that exchanges messages comprising a state of at least one business process in a bidirectional manner with the at least one industrial controller and employs either a deadline valued data expression or a duration-valued data expression to process the messages and to dynamically alter interface control functionality responsive to the messages.

31. An industrial automation system, comprising:
a processor executing computer executable components stored in memory, the components comprising:
at least one controller that employs a Business Process Execution Language (BPEL) to control operations of an enterprise; and
at least one operator interface that exchanges messages in a bidirectional manner with the at least one controller, wherein the at least one operator interface dynamically alters its control functionality responsive to the messages,
wherein the messages comprise one or more business process activity, wherein a business process activity includes fault and delay processing and the fault and delay processing employs at least one of: a throw activity that provides a globally unique name for a fault or a wait activity that allows the business process to specify a delay for at least one of: a period of time or until a deadline is reached.

32. The system of claim 31, wherein the at least one operator interface comprises an event processing component that processes the messages as an event.

* * * * *